United States Patent [19]

Sato et al.

[11] Patent Number: 4,560,571

[45] Date of Patent: Dec. 24, 1985

[54] PROCESS FOR THE PREPARATION OF INSTANT COFFEE OR THE LIKE

[75] Inventors: Jinichi Sato; Toshiro Kurusu; Naoyoshi Kondo, all of Iwakura; Makoto Tamaki, Komaki, all of Japan

[73] Assignee: Sato Shokuhin Kogyo Kabushiki Kaisha, Komaki, Japan

[21] Appl. No.: 407,241

[22] Filed: Aug. 10, 1982

Related U.S. Application Data

[63] Continuation-in-part of Ser. No. 285,034, Jul. 20, 1981, abandoned.

[30] Foreign Application Priority Data

Aug. 9, 1980 [JP] Japan ................................ 55-109477
Jan. 19, 1981 [JP] Japan ................................ 56-004962

[51] Int. Cl.$^4$ ........................... A23F 5/26; A23F 5/44
[52] U.S. Cl. .................................. 426/594; 426/596; 426/655
[58] Field of Search ............... 426/650, 651, 655, 598, 426/597, 596, 594

[56] References Cited

U.S. PATENT DOCUMENTS

| | | | |
|---|---|---|---|
| 2,827,452 | 3/1958 | Achlenk et al. | 426/651 X |
| 3,022,173 | 2/1962 | Tiedemann | 426/594 X |
| 3,061,444 | 10/1962 | Rogers et al. | 426/651 X |
| 3,140,184 | 7/1964 | Robbins | 426/650 X |
| 3,425,910 | 2/1969 | Armbruster et al. | 426/97 |
| 3,453,259 | 7/1969 | Parmerter et al. | 426/650 X |
| 3,459,731 | 8/1969 | Gramera et al. | 426/650 X |
| 3,459,732 | 8/1969 | Hill et al. | 426/650 X |
| 3,528,819 | 9/1970 | Hamilton et al. | 426/594 |
| 4,001,438 | 1/1977 | Marmo et al. | 426/651 X |
| 4,474,822 | 10/1984 | Sato et al. | 426/594 X |

OTHER PUBLICATIONS

Pintauro, Soluble Coffee Manufacturing Process, 1969, Noyes Development Corp.; Park Ridge, N.J., pp. 28–29.

*Primary Examiner*—Joseph Golian
*Attorney, Agent, or Firm*—Browdy and Neimark

[57] ABSTRACT

Roasted coffee beans, roasted beans or roasted cereals are extracted with a cyclic dextrin-containing liquid and/or this extract is dried to obtain an instant beverage. According to this process, valuable components of roasted coffee beans or the like are effectively extracted by the cyclic dextrin-containing liquid, and extracted soluble and aromatic components are effectively protected by the cyclic dextrin when the extract is dried to form an instant beverage. The obtained instant beverage such as instant coffee has excellent fragrance and flavor.

2 Claims, No Drawings

PROCESS FOR THE PREPARATION OF INSTANT COFFEE OR THE LIKE

FIELD OF INVENTION

This is a continuation-in-part of parent copending application Ser. No. 285,034, filed July 20, 1981, now withdrawn in favor of the present case the description of the invention of which is incorporated herein.

The present invention relates to a process for the preparation of instant beverages such as instant coffee. More particularly, the present invention relates to a process for the preparation of instant beverages in which soluble flavor and aromatic components present in roasted coffee beans, roasted beans or roasted cereals are extracted stably and effectively and the extract is dried without deterioration or evaporation of these soluble flavor and aromatic components to obtain an instant beverage which has excellent flavor and fragrance comparable to those of coffee obtained by making fresh coffee by the usual methods.

DESCRIPTION OF PRIOR ART

In case of regular coffee usually drunk (regular coffee), water is boiled in a coffee pot in advance, and ground roasted coffee beans are directly put in boiling water (the standard amount is 10 g of ground roasted coffee beans per 100 ml of boiling water) and are boiled in boiling water to effect extraction or are similarly extracted by using a percolator or the like. The obtained extract contains caffeine, tannic acid, saccharides, fats, proteins and various aromatic components and it has a good fragrance inherent to coffee and a peculiar complicated flavor inclusive of a bitter taste, an astringent taste and an acid taste. When roasted coffee beans are ground and then allowed to stand in air, they are readily oxidized to degrade the fragrance, and when tepid water is used for extraction, the contact time for extraction of roasted coffee beans should be prolonged. Furthermore, if the boiling time is too long or the extract is allowed to stand for a long time, the fragrance and flavor are degraded. Accordingly, even in case of regular coffee, the method of making coffee is very difficult, and it is very difficult to always obtain coffee rich in flavor and fragrance.

Coffee extract concentrates and coffee extract powders have heretofore been manufactured on an industrial scale, and instant coffee beverages which can instantly be drunk by dissolving them in hot water or cold water have been prepared and marketed. Ordinarily, these instant coffee beverages are prepared according to a process comprising charging ground roasted coffee beans in an extraction tank, extracting the beans with hot water or boiling water, and subjecting the extract directly or after concentration, such as reduced pressure concentration or freeze concentration, to such a drying treatment such as spray drying, vacuum drying or freeze drying. Instant coffee beverages prepared according to such conventional process contain even extracted components which cannot ordinarily be drunk, through the amounts of these components differ to some extent according to the extraction conditions such as the extraction temperature and time, the concentration conditions and the drying conditions. Furthermore, since the extract is exposed to high temperatures for a long time during the preparation, the flavor and fragrance are degraded by evaporation and oxidative decomposition of aromatic components, and a delicate aroma inherent to coffee is lost and the product comes to have an excessive scorching taste. In short, the obtained beverage is far from coffee in both the flavor and fragrance.

SUMMARY OF INVENTION

Research has now been made with a view to overcome the defect of reduction of the flavor and fragrance by loss of aromatic components in conventional instant beverages such as instant coffee, and it has now been found that when roasted coffee beans, roasted beans or cereals are extracted with a liquid containing cyclic dextrin (Schardinger dextrin), soluble components and aromatic components are extracted at a high efficiency, and there are obtained excellent instant beverages in which these components are effectively protected and deterioration or evaporation of these components does not occur at the drying step or during storage.

More specifically, in accordance with the present invention, there is provided a process for the preparation of instant beverages, which comprises extracting one member selected from roasted coffee beans, roasted beans and roasted cereals with a liquid, e.g. water, containing a cyclic dextrin.

When extraction is carried out by using a cyclic dextrin-containing liquid according to the present invention, the liquid intrudes into the texture of coffee beans to selectively leach out valuable components and these valuable components can be obtained in such a protected state that deterioration is effectively prevented. It is believed that cyclic dextrin dissolved in the extracting liquid exerts a function of partially including or associating soluble and aromatic components in the peripheral portion of cyclic dextrin in the dissolved state reversibly or irreversibly.

Accordingly, if the so obtained extract containing soluble and aromatic components of coffee beans or the like which are protected by cyclic dextrin is dried at a temperature as low as possible by freeze drying, vacuum drying or spray drying, an instant beverage having good flavor and fragrance is provided comparable to those of coffee obtained by the ordinary method of making coffee.

DETAILED DESCRIPTION OF PREFERRED EMBODIMENTS

Cyclic dextrin that is used in the present invention is obtained by a method comprising reacting starch with a culture liquid of *Bacillus macerans* or with an enzyme liquid formed therefrom, and commercially available products manufactured by this method or other appropriate methods can be utilized in the present invention. Ordinarily, a product is obtained by liquefying or gelatinizing starch, reacting the liquefied or gelatinized starch with a cyclic oligosaccharide-forming enzyme or purifying the resulting $\alpha$-, $\beta$-, $\gamma$-cyclodextrin and other cyclodextrin or a mixture thereof or by liquefying or gelatinizing starch, reacting the liquefied or gelatinized starch with a cyclic oligosaccharide-forming enzyme, separating the obtained mixture of cyclic dextrin and acyclic dextrin and purifying the separated mixture optionally after hydrolyzing the dextrin mixture with an enzyme or the like under such conditions as not causing decomposition of cyclic dextrin.

When a mixture of cyclic dextrin and acyclic dextrin is used, it is preferred that the ratio of cyclic dextrin be at least 10% of the mixture and the average degree of polymerization of the acyclic dextrin portion be 3 to 40. However, these values are not critical, but other values may optionally be chosen according to need. The content of cyclic dextrin in the extracted components is ordinarily at least 1.0% and preferably at least 1.5%.

In accordance with one preferred embodiment of the present invention, an ethyl alcohol-containing liquid is incorporated into the cyclic dextrin-containing liquid. The ethyl alcohol-containing liquid used is selected from ethyl alcohol and spirits such as vodka, whisky, brandy and rum. The concentration of ethyl alcohol in the cyclic dextrin-containing liquid is preferably 10 to 60%. If the concentration of ethyl alcohol is higher than 60%, unsavory components or peculiar aromatic components are extracted, and if the concentration of ethyl alcohol is lower than 10%, the intended effect by the use of the ethyl alcohol-containing extraction liquid cannot be attained.

The cyclic dextrin-containing liquid that is used in the present invention contains 1.0 to 20%, preferably 1.5 to 6.0%, of cyclic dextrin.

The cyclic dextrin-containing liquid is used in an amount 2 to 30 times, preferably 4 to 15 times, the amount of roasted coffee beans, roasted beans or cereals on the weight basis. Extraction can be carried out batchwise or in a continuous manner. In case of coffee, the extraction temperature is ordinarily 50° to 90° C., and in some case, it is preferred that extraction is carried out at 10° to 50° C. for a long time. Since deterioration of the extracted components is not caused in the present invention, a concentrated extract can be obtained by recycling the extract to the extraction step 2 to 10 times repeatedly.

When a non-modification smell is left in the extract obtained by low temperature extraction because heating is not effected, this smell can be removed by heating the extract at an ordinary extraction temperature of 60° to 90° C. for a short time.

The so obtained liquid extract may be packed in a can as it is or after sugar or the like necessary for a beverage is added to the extract, and the canned extract is marketed. Aromatic components are not deteriorated during storage and a high quality can be maintained.

Furthermore, according to the present invention, the obtained extract may be dried at a temperature as low as possible by spray drying, vacuum drying or freeze drying, whereby a powder having a good quality and a high storage stability is obtained without no substantial deterioration by evaporation due to drying.

In the present invention, the aromatic components can be protected effectively by cyclic dextrin during drying and after drying. Accordingly, excellent instant coffee and other instant beverages having good fragrance and flavor can be obtained.

In the present invention, not only roasted coffee beans but also roasted cacao beans and other roasted beans, roasted cereals such as roasted barley, rye and rice can be used. When these starting materials are extracted according to the process of the present invention and are subsequently dried according to need, there can be obtained instant beverages having good fragrance and flavor and high quality stability.

The present invention will now be described in detail with reference to the following Examples that by no means limit the scope of the invention.

EXAMPLE 1

(A) In 4 l of hot water maintained at 80° C. were immersed 1 kg of blended coffee beans (drip grind) for 20 minutes, and the immersed beans were squeezed to obtain 3.4 kg of a squeeze liquid having a Brix value of 8°. Then, 1 kg of the same coffee beans were similarly extracted by using the obtained squeeze liquid to obtain 2.8 kg of a squeeze liquid having a Brix value of 16.6°. The squeeze liquid was clarified by a centrifugal separator. Then, 0.35 kg of enzyme-modified dextrin (having an average degree of polymerization of 5.1) was incorporated and dissolved in 2.8 kg of the obtained extract having a solid concentration of 13.6%, and the liquid was spray-dried at a chamber temperature of 85° C. by using a spray drier to obtain about 0.7 kg of a powdered coffee extract (hereinafter referred to as "C.A").

(B) In 2.8 kg of an extract (having a solid concentration of 13.6% ) prepared in the same manner as described in (A) above was incorporated and dissolved 0.35 kg of a mixture comprising 50% of a cyclic dextrin (consisting of 60% of α-cyclodextrin, 26% of β-cyclodextrin and 14% of γ-cyclodextrin) and 50% of acyclic dextrin having an average degree of polymerization of 25, and the liquid was spray-dried under the same conditions as described in (A) above to obtain about 0.7 kg of a powdered coffee extract (hereinafter referred to as "C.B").

(C) The same blended coffee beans (drip grind) as used in (A) above were extracted under the same conditions as described in (A) above by using an aqueous solution obtained by dissolving 0.35 kg of the same cyclic dextrin/acyclic dextrin mixture as described in (B) above in 4 l of hot water maintained at 80° C., and the obtained squeeze liquid was clarified by a centrifugal separator to obtain 3.2 kg of an extract having a solid concentration of 22.2%. The extract was spray-dried under the same conditions as described in (A) above to obtain about 0.7 kg of a powdered coffee extract (hereinafter referred to as "C.C").

Each of the so-obtained powdered coffee extracts C.A, C.B and C.C was dissolved in hot water maintained at 80° C. in an amount of 2 g per 100 ml of hot water, and organoleptic tests were carried out by 10 experts and the flavor and fragrance were collectively evaluated (3 points, 2 points and 1 point were given to the best coffee, second coffee and third coffee, respectively). It was found the total points of C.C, C.B and C.A were 30 points, 17 points and 13 points, respectively, and C.C was evaluated as best. C.C had a fresh mild fragrance not substantially different from the fragrance of regular coffee and was well-balanced in the aromatic fragrance and flavor. On the other hand, C.A. was substantially free of coffee fragrance and had a scorching smell and was inferior in the taste. C.B was slightly superior to C.A in the fragrance and flavor, but was much inferior to C.C.

EXAMPLE 2

Each of columns of a continuous counter-current extractor (comprising continuous 4 columns) equipped with a jacket was packed with 1 kg of fully roasted, regular grind Columbia coffee beans, and the temperature of water circulated in the jacket was maintained at 20° C. Cyclic dextrin-containing liquid (aqueous solution formed by dissolving 1.25 parts of β-cyclodextrin in 100 parts of water) was fed under pressure at a rate of 1.5 l/hr from the bottom to the top in the extraction column. As the extract, there was collected initial 6 l of the overflow liquid. The Brix value of the recovered extract was 34.2° and the solid concentration was 26%. The extract was cooled below 0° C. and carbon dioxide gas was blown into the extract to form bubbles. Then, the extract was frozen in a freezing chamber maintained at −30° C. The frozen extract was placed on a heating shelf and dried at a drying plate temperature lower than 45° C. under vacuum of less than 0.5 Torr by a vacuum freeze drier to obtain 1.5 kg of a dried coffee extract. When 1.6 g of this dried coffee extract was dissolved in 100 ml of warm water, there was obtained water-brewed coffee which retained fresh aromatic components of coffee beans having a low boiling point and had a light taste.

EXAMPLE 3

In 22 kg of a whisky liquid having an alcohol content adjusted to 42% by weight was dissolved 4.4 kg of a cyclic dextrin-containing liquid (comprising 16% of α-, β- and γ-cyclodextrins, 2.6% of glucose, 8.8% of maltose, 47.6% of oligosaccharides and 25% of water), and the solution was heated at 30° C. and 10 kg of regular grind Kilimanjaro coffee beans were immersed in the solution for 2 hours. The immersed coffee beans were compressed to obtain 21.8 kg of a squeeze liquid having a Brix value of 32.8°. The same coffee beans (10 kg) as described above were similarly extracted by using the so-obtained squeeze liquid, and the resulting squeeze liquid was clarified by a centrifugal separator to obtain 17.3 kg of an extract having Brix value of 39.8°, a solid concentration of 28.4% and an alcohol content of 29% by weight. The extraction residue (29.0 kg) left after the compression step was immersed for 10 minutes in a solution formed by dissolving 1 kg of β-cyclodextrin powder in 40 kg of warm water maintained at 80° C. and compressed to obtain 33.5 kg of a squeeze liquid having a Brix value of 11.5°, a solid concentration of 9.6% and an alcohol content of 3.5%. The squeeze liquid was similarly clarified and the resulting extract was subjected to reduced pressure concentration at a liquid temperature lower than 65° C. by using a reduced pressure concentrator to obtain 6 kg of a concentrated coffee extract having a Brix value of 60° and a solid concentration of 52.2%. This concentrated extract and 6.8 kg of enzyme-treated dextrin (having an average degree of polymerization of 12) were added to 17.3 kg of the above extract obtained by using the whisky liquid, and the mixture was spray-dried at a chamber temperature of 75° C. to obtain 19 kg of a powdered coffee extract having an alcohol content of 22%. When 3 g of the powdered coffee extract was dissolved in 100 ml of warm water, there was obtained whisky coffee having a rich aromatic fragrance.

EXAMPLE 4

An extraction tank was charged with 200 kg of ground blended coffee beans, and 60 kg of β-cyclodextrin was dissolved in 2000 l of hot water maintained at 80° C. and the solution was added to the coffee beans. The mixture was stirred and extracted for 15 minutes. Dregs were separated by a continuous disphragm type filter press, and the obtained extract was clarified by a continuous centrifugal separator to obtain 1900 l of a coffee extract having a Brix value of 6.4°, which retained flavor and fragrance characteristics of the starting blend coffee beans and had a fresh aroma inherent to just-made fresh coffee. The extract was free of a scorching smell (caramel smell) and had well-balanced coffee flavor and fragrance.

Then, 100 kg of sugar was incorporated and dissolved in 1900 l of the extract and the solution was packed in aluminum cans, and the canning operation was carried out according to customary procedures (sterilizing conditions: 120° C., 10 minutes) to obtain canned black coffee.

The flavor and fragrance of the canned black coffee were not different from those before the canning operation, and when this canned black coffee was stored for a long time, no change of the flavor and fragrance occurred and formation of dregs or other sediments was not observed.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A process for the preparation of instant beverages, which comprises extracting one part by weight of one member selected from the group consisting of roasted coffee beans and roasted cereals with 2 to 30 parts by weight of an aqueous solution containing cyclic dextrin having a cyclic dextrin content of 1.5 to 6%, and spray-drying the extract.

2. A process according to claim 1, wherein the parts by weight of the aqueous cyclic dextrin are 4 to 15 parts by weight per part by weight of the roasted beans or cereal.

* * * * *